(12) United States Patent
Diez et al.

(10) Patent No.: US 9,181,614 B2
(45) Date of Patent: Nov. 10, 2015

(54) METHOD FOR MANUFACTURING A COATED METAL STRIP WITH AN ENHANCED APPEARANCE

(75) Inventors: Luc Diez, Metz (FR); Jean-Michel Mataigne, Senlis (FR); Bertrand Orsal, Vineuil-Saint-Firmin (FR); Hubert Saint Raymond, Metz (FR)

(73) Assignee: ARCELORMITTAL INVESTIGACIÓN Y DESARROLLO, S.L., Sestao Bizkaia (ES)

( * ) Notice: Subject to any disclaimer, the term of this patent is extended or adjusted under 35 U.S.C. 154(b) by 683 days.

(21) Appl. No.: 13/320,367

(22) PCT Filed: May 7, 2010

(86) PCT No.: PCT/FR2010/000357
§ 371 (c)(1),
(2), (4) Date: Jan. 12, 2012

(87) PCT Pub. No.: WO2010/130890
PCT Pub. Date: Nov. 18, 2010

(65) Prior Publication Data
US 2012/0107636 A1    May 3, 2012

(51) Int. Cl.
*C23C 2/20* (2006.01)
*C23C 2/06* (2006.01)

(52) U.S. Cl.
CPC ... *C23C 2/20* (2013.01); *C23C 2/06* (2013.01); *Y10T 428/12389* (2015.01)

(58) Field of Classification Search
CPC ...... C23C 2/06; C23C 2/20; Y10T 428/12389
USPC .......................................................... 427/349
See application file for complete search history.

(56) References Cited

U.S. PATENT DOCUMENTS 4,056,657 A * 11/1977 Leckie et al. ................. 428/659
4,369,211 A *  1/1983 Nitto et al. .................... 427/349

(Continued)

FOREIGN PATENT DOCUMENTS

| CN | 1612947 A | 5/2005 |
|---|---|---|
| EP | 0 038 904 | 11/1981 |

(Continued)

OTHER PUBLICATIONS

Machine Translation, Hashida et al., JP 2002-348651, Dec. 2002.*
International Search Report Issued Oct. 4, 2010 in PCT/FR10/000357 Filed May 7, 2010.
U.S. Appl. No. 13/121,833, filed Aug. 5, 2011, Diez, et al.

*Primary Examiner* — Dah-Wei D Yuan
*Assistant Examiner* — Kristen A Dagenais
(74) *Attorney, Agent, or Firm* — Davidson, Davidson & Kappel, LLC

(57) ABSTRACT

One subject of the invention is a process for manufacturing a metal strip having a metal coating for corrosion protection, comprising the steps consisting in:
  making the metal strip pass through a bath of molten metal, comprising 0.2 to 8% by weight of aluminum and magnesium in the following proportions:
    0.1 to 8% by weight of magnesium for an aluminum content equal to or greater than 0.2% but less than 4% by weight or
    a content greater than 5% but less than or equal to 8% by weight of magnesium for an aluminum content equal to or greater than 4% but less than or equal to 8% by weight,
  and comprising up to 0.3% by weight of addition elements, the balance being zinc and inevitable impurities; then
  wiping the coated metal strip by means of nozzles that spray a gas on each side of the strip, said gas having an oxidizing power lower than that of an atmosphere consisting of 4% oxygen by volume and 96% nitrogen by volume; and then
  making the strip pass through a confinement zone bounded:
    at the bottom, by the wiping line and the upper external faces of said wiping nozzles,
    at the top, by the upper part of two confinement boxes placed on each side of the strip, just above said nozzles, and having a height of at least 10 cm in relation to the wiping line and
    on the sides, by the lateral parts of said confinement boxes,
the atmosphere in said confinement zone having an oxidizing power lower than that of an atmosphere consisting of 4% oxygen by volume and 96% nitrogen by volume and higher than that of an atmosphere consisting of 0.15% oxygen by volume and 99.85% nitrogen by volume.
Other subjects of the invention are a metal strip that can be obtained by this process and a metal part obtained by deforming this strip.

18 Claims, 1 Drawing Sheet

(56) References Cited

U.S. PATENT DOCUMENTS

| | | | |
|---|---|---|---|
| 4,421,054 A * | 12/1983 | Stavros | 118/63 |
| 4,557,952 A | 12/1985 | Mitch et al. | |
| 4,557,953 A * | 12/1985 | Boston et al. | 427/432 |
| 4,612,215 A | 9/1986 | Hennechart et al. | |
| 6,235,410 B1 * | 5/2001 | Komatsu et al. | 428/659 |
| 6,379,820 B1 * | 4/2002 | Komatsu et al. | 428/659 |
| 6,677,058 B1 * | 1/2004 | Komatsu et al. | 428/659 |
| 6,797,411 B2 | 9/2004 | Sodani et al. | |
| 7,534,502 B2 | 5/2009 | Honda et al. | |
| 2011/0111255 A1 | 5/2011 | Diez et al. | |
| 2011/0177253 A1 | 7/2011 | Oohashi et al. | |

FOREIGN PATENT DOCUMENTS

| | | |
|---|---|---|
| EP | 0 122 856 | 10/1984 |
| EP | 0905270 A2 * | 12/1997 |
| EP | 0 905 270 | 3/1999 |
| JP | 11140615 A | 5/1999 |
| JP | 2002 348651 | 12/2002 |
| JP | 2002348651 A * | 12/2002 |
| JP | 2003013194 A | 1/2003 |
| JP | 2008095129 A | 4/2008 |

* cited by examiner

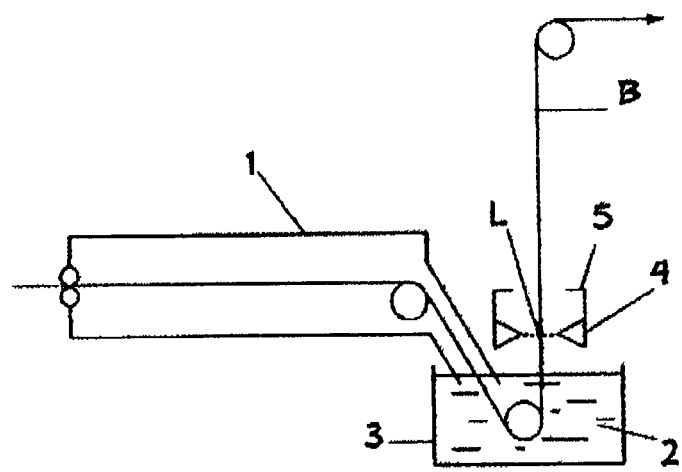

METHOD FOR MANUFACTURING A COATED METAL STRIP WITH AN ENHANCED APPEARANCE

The invention relates to a process for manufacturing a metal strip of improved appearance, more particularly one intended to be used for the manufacture of shell parts for terrestrial motor vehicles, without however being limited thereto.

Steel sheet intended for the manufacture of parts for a terrestrial motor vehicle is generally coated with a zinc-based metal layer for corrosion protection, deposited either by hot-dip coating in a zinc-based liquid bath or by electrodeposition in an electroplating bath containing zinc ions.

Galvanized sheet intended for the manufacture of shell parts then undergoes a forming operation and is assembled to form a body-in-white, which is then coated with at least one coat of paint, thereby providing greater corrosion protection and an attractive surface appearance.

For this purpose, conventionally, automobile manufacturers firstly apply a cataphoretic coating to the body-in-white, followed by a primer coat of paint, a base coat of paint and optionally a varnish coat. To obtain a satisfactory painted surface appearance, it is general practice to apply a total paint thickness of between 90 and 120 µm, consisting of a cataphoretic coating 20 to 30 µm in thickness, a primer coat of paint 40 to 50 µm in thickness and a base coat of paint 30 to 40 µm in thickness, for example.

To reduce the thickness of paint systems to less than 90 µm, certain automobile manufacturers have proposed either to dispense with the cataphoresis step or to reduce the number of coats of paint in order to increase productivity. However, at the present time, this thickness reduction of the paint system is always to the detriment of the final appearance of the painted surface of the part and is not implemented in industrial production.

The reason for this is that the surface of the zinc-based coatings serving as base substrate has what is called a "waviness" which, at the present time, can be compensated for only by thick coats of paint under penalty of having what is called an "orange peel" appearance, which is unacceptable for body parts.

The waviness W of the surface is a slight pseudoperiodic geometrical irregularity with quite a long wavelength (0.8 to 10 mm) which is distinguished from the roughness R, which corresponds to geometrical irregularities of shorter wavelengths (<0.8 mm).

In the present invention, the arithmetic mean Wa of the waviness profile, expressed in µm, is used to characterize the surface waviness of the sheet, and the waviness is measured with a 0.8 mm cutoff threshold denoted by $Wa_{0.8}$.

One object of the invention is therefore to provide a process for manufacturing a metal strip coated with a corrosion protection coating, the waviness $Wa_{0.8}$ of which is smaller than in strip of the prior art, thus making it possible to manufacture painted metal parts requiring a smaller total paint thickness compared with the parts of the prior art.

For this purpose, a first subject of the invention is formed by a process for manufacturing a metal strip having a metal coating for corrosion protection, comprising the steps consisting in:
  making the metal strip pass through a bath of molten metal, comprising 0.2 to 8% by weight of aluminum and magnesium in the following proportions:
    0.1 to 8% by weight of magnesium for an aluminum content equal to or greater than 2% but less than 4% by weight or
    a content greater than 5% but less than or equal to 8% by weight of magnesium for an aluminum content equal to or greater than 4% but less than or equal to 8% by weight,
  and comprising up to 0.3% by weight of addition elements, the balance being zinc and inevitable impurities; then
  wiping the coated metal strip by means of nozzles that spray a gas on each side of the strip, said gas having an oxidizing power lower than that of an atmosphere consisting of 4% oxygen by volume and 96% nitrogen by volume; and then
  making the strip pass through a confinement zone bounded:
    at the bottom, by the wiping line and the upper external faces of said wiping nozzles,
    at the top, by the upper part of two confinement boxes placed on each side of the strip, just above said nozzles, and having a height of at least 10 cm in relation to the wiping line and
    on the sides, by the lateral parts of said confinement boxes,
  the atmosphere in said confinement zone having an oxidizing power lower than that of an atmosphere consisting of 4% oxygen by volume and 96% nitrogen by volume and higher than that of an atmosphere consisting of 0.15% oxygen by volume and 99.85% nitrogen by volume.

In preferred methods of implementation, the process according to the invention may further include the following features, individually or in combination:
  the confinement boxes have a height of at least 15 cm, even 20 cm and more particularly preferably of at least 30 cm, in relation to the wiping line;
  the confinement boxes are fed with a gas having an oxidizing power lower than that of an atmosphere consisting of 4% oxygen by volume and 96% nitrogen by volume, and preferably higher than that of an atmosphere consisting of 0.15% oxygen by volume and 99.85% nitrogen by volume;
  the strip is furthermore made to pass through a confinement zone located before the wiping line;
  the confinement zone located before the wiping starts at the outlet of the molten metal bath and finishes beneath the wiping line;
  the wiping gas consists of nitrogen; and
  the metal strip is a steel strip.

The subject of the invention is also a hot-dip-coated but non-skin-passed cold-rolled metal strip that can be obtained by the process according to the invention and, the metal coating of which has a waviness $Wa_{0.8}$ of less than or equal to 0.70 µm, preferably less than or equal to 0.65 µm and comprises 0.2 to 8% by weight of aluminum and magnesium in the following proportions:
  0.1 to 8% by weight of magnesium for an aluminum content equal to or greater than 0.2% but less than 2% by weight or
  a content greater than 5% but less than or equal to 8% by weight of magnesium for an aluminum content equal to or greater than 2% but less than or equal to 8% by weight,
and comprising up to 0.3% by weight of addition elements, the balance being zinc and inevitable impurities.

In a preferred embodiment, the metal strip according to the invention consists of steel.

The subject of the invention is also a metal part obtained by deforming a metal strip according to the invention, the coating of which has a waviness $Wa_{0.8}$ of less than or equal to 0.65 µm, preferably less than or equal to 0.60 µm.

Yet another subject of the invention is a metal part obtained by deforming a metal strip according to the invention, furthermore having undergone a skin-pass operation before deformation, the coating of which has a waviness $Wa_{0.8}$ of less than or equal to 0.70 µm, preferably less than or equal to 0.60 µm, or even 0.55 µm.

The features and advantages of the present invention will become more clearly apparent over the course of the following description given by way of nonlimiting example.

Referring to FIG. 1, the first step of the process according to the invention consists in making a metal strip B, such as a steel strip, pass continuously through a coating bath 2 comprising molten metal contained in a tank 3. Before being dipped into this bath 2, the strip generally undergoes an annealing operation in a furnace 1, especially for preparing the surface.

On industrial lines, the strip run speed is in general between, for example, 40 m/min and 200 m/min, preferably greater than 120 m/min or even greater than 150 m/min.

The composition of the coating bath to be used in the process according to the invention is based on zinc and initially contains 0.2% to 8% by weight of aluminum. This element makes it possible, on the one hand, to improve the adhesion of the coating to the metal strip and, on the other hand, to protect the strip from corrosion.

Below a 0.2% content, no effect on the adhesion is observed, whereas a content of greater than 8% poses problems as the subsequently applied paint delaminates.

The bath also contains magnesium to improve the corrosion resistance of the galvanized coating and in particular the red rust resistance thereof. The magnesium is present in the following proportions:
 0.1 to 8% by weight of magnesium for an aluminum content equal to or greater than 0.2% but less than 4% by weight or
 a content greater than 5% but less than or equal to 8% by weight of magnesium for an aluminum content equal to or greater than 4% but less than or equal to 8% by weight.

In a preferred embodiment, the magnesium is present in the following proportions:
 0.1 to 8% by weight of magnesium for an aluminum content equal to or greater than 0.2% but less than 2% by weight or
 a content greater than 5% but less than or equal to 8% by weight of magnesium for an aluminum content equal to or greater than 2% but less than or equal to 8% by weight.

In another preferred embodiment, the magnesium is present in the following proportions:
 0.1 to 8% by weight of magnesium for an aluminum content equal to or greater than 0.2% but less than 1.5% by weight or
 a content greater than 5% but less than or equal to 8% by weight of magnesium for an aluminum content equal to or greater than 1.5% but less than or equal to 8% by weight.

To obtain an appreciable effect on the corrosion resistance, it is preferred to add at least 0.1% by weight, or even 0.2% by weight, of magnesium. The maximum content thereof in the bath is limited to 8% by weight since the coating obtained could have severe cracking problems during the subsequent forming, especially a drawing operation. The 0.1 to 5% magnesium by weight and 4 to 8% aluminum by weight range is eliminated as the formation of visual defects, that can be seen with the naked eye, is observed when the strip is subjected to the confined wiping process according to the invention in this composition range.

The composition of the bath may also contain up to 0.3% by weight of optional addition elements such as Si, Sb, Pb, Ti, Ca, Mn, Sn, La, Ce, Cr, Ni, Zr or Bi. These various elements may make it possible, inter alia, to improve the corrosion resistance of the coating or its brittleness or its adhesion for example. A person skilled in the art knowing their effects on the characteristics of the coating will employ them in accordance with the intended complementary purpose. It has also been confirmed that these elements do not interfere with the waviness control obtained by the process according to the invention. Under certain circumstances, it will however be preferable to limit the titanium content to less than 0.01%, or even less than 0.005%, since this element may cause contamination problems in the degreasing and phosphating baths used by automobile manufacturers.

Finally, the bath may contain inevitable impurities coming from the ingots fed into the tank or else from the strip passing through the bath. Thus, these may include in particular iron, etc.

The bath is maintained at a temperature between the liquidus +10° C. and 700° C., the temperature of the liquidus varying depending on its composition. For the range of coatings used in the present invention, this temperature will therefore be between 350 and 700° C. It will be recalled that the liquidus is the temperature above which an alloy is entirely in the molten state.

After having passed through the tank 3, the metal strip B coated on both its faces then undergoes a wiping operation by means of nozzles 4 placed on each side of the strip B, which nozzles spray a wiping gas onto the surface of the strip B. This conventional operation, well known to those skilled in the art, enables the thickness of the coating, although it has not yet solidified, to be precisely adjusted.

One of the essential features of the process according to the invention consists in choosing a wiping gas having an oxidizing power lower than that of an atmosphere consisting of 4% oxygen by volume and 96% nitrogen by volume. In particular, it will be possible to use pure nitrogen or pure argon, or else mixtures of nitrogen or argon and oxidizing gases such as, for example, oxygen, $CO/CO_2$ mixtures or $H_2/H_2O$ mixtures. It will also be possible to use $CO/CO_2$ mixtures or $H_2/H_2O$ mixtures without the addition of an inert gas.

After the wiping step, the other essential feature of the process according to the invention is the passage through a confinement zone bounded:
 at the bottom, by the wiping line and the upper external faces of the wiping nozzles 4;
 at the top, by the upper part of two confinement boxes 5 placed on each side of the strip, just above the nozzles 4, and having a height of at least 10 cm in relation to the wiping line; and
 on the sides, by the lateral parts of the confinement boxes 5, the atmosphere in the confinement zone having an oxidizing power lower than that of an atmosphere consisting of 4% oxygen by volume and 96% nitrogen by volume and higher than that of an atmosphere consisting of 0.15% oxygen by volume and 99.85% nitrogen by volume.

To determine the oxidizing power of the atmosphere surrounding the strip, its equivalent equilibrium oxygen partial pressure is evaluated.

When the only oxidizing gas present is $O_2$ mixed with an inert gas (nitrogen or argon), this pressure is then equal to the volume content of $O_2$ that can be measured in real time by means of a suitable sensor.

When other oxidizing gases, such as $H_2O$ or $CO_2$, are present mixed with a reducing gas such as for example $H_2$ or CO, the equivalent oxygen partial pressure is calculated by the law of mass action at the gas temperature in question.

For example, for the $H_2/H_2O$ pair, the reaction is expressed as follows:

$$H_2 + \tfrac{1}{2} O_2 \leftrightarrow H_2O.$$

In thermodynamic equilibrium, the partial pressures of the gases obey the following equation:

$$\frac{pH_2O}{pH_2 \times \sqrt{pO_2}} = e^{-\frac{\Delta G}{RT}}$$

where R is the perfect gas constant, T is the gas temperature in kelvin and $\Delta G$ is the change in free energy associated with the reaction, which may be found in thermodynamic tables, in calories per mole or in joules per mole depending on the value taken for the constant R.

The value of $pO_2$, the equivalent equilibrium oxygen partial pressure for the gas mixture in question, is obtained from the above equation.

Within the context of the invention, it is necessary for $pO_2$ to be between 0.0015 and 0.04 in the confinement boxes 5.

The present inventors have in fact found that by using a wiping gas according to the invention and making the strip pass through such a confinement zone, surprisingly a coating having a waviness smaller than that of coated strip of the prior art is obtained.

Within the context of the present application, the term "wiping line" is understood to mean the shortest segment connecting the nozzle and the strip, corresponding to the minimum path followed by the wiping gas, as denoted by the letter L in FIG. 1.

The confinement boxes 5 used in the process according to the invention may be supplied with gas having a low oxidizing power, or else an inert gas, or they may simply be supplied by the flow of wiping gas escaping from the nozzles.

The oxidizing power of the wiping gas and of the confinement atmosphere is limited to that of a mixture consisting of 4% oxygen by volume and 96% nitrogen by volume, since above this degree of oxidation, the waviness of the coating is not improved over that of the prior art.

In contrast, a lower limit for the oxidizing power of the confinement atmosphere is imposed, set to the oxidizing power of a mixture consisting of 0.15% oxygen by volume and 99.85% nitrogen by volume, since if this confinement atmosphere is not oxidizing enough, its use will promote zinc vaporization from the not yet solidified coating, which vapor may then foul the confinement boxes and/or may be redeposited on the strip, thus creating unacceptable visible defects.

To limit the oxidation before wiping, it may also be desirable, but not obligatory, to extend the confinement boxes right up to the surface of the bath or up to an intermediate position between the bath and the wiping line, preferably located at a distance of 10 cm, or even 15 cm, beneath the wiping line. This is because when the surface of the metal sheet is exposed to free air, such a layer forms systematically but is usually removed and returned to the coating bath under the impact of the wiping jet. Such confinement therefore makes it possible to reduce the amount of oxides in the bath that may be entrained by the running strip and thus may create unacceptable defects. However, it has the drawback here again of promoting the vaporization of zinc from the bath or from the liquid coating, and it will therefore be preferable for the atmosphere in these additional confinement boxes to have a higher oxidizing power than that of an atmosphere containing 0.15% oxygen by volume and 99.85% nitrogen by volume.

Although all kinds of wiping nozzles may be used to implement the process according to the invention, it is more particularly preferred to chose nozzles having a blade-shaped outlet orifice, the width of which exceeds that of the strip to be coated, since this type of nozzle enables the bottom part of the wiping zone to be properly confined. In particular, nozzles of triangular cross section, as shown schematically in FIG. 1, may advantageously be used. These nozzles are generally located 30 or even 40 cm above the surface of the bath.

By respecting these settings, a surprising and significant reduction in the waviness of the coatings in question is observed, as the trials presented below demonstrate.

When the coated strip has completely cooled, it may undergo a skin-pass operation enabling it to be given a texture facilitating its subsequent forming process. This is because the skin-pass operation gives the surface of the strip sufficient roughness in order for the forming process to be properly carried out thereon, by promoting good retention of the oil applied to the strip before it is formed.

This skin-pass operation is generally carried out for metal sheet intended for the manufacture of body parts for terrestrial motor vehicles. When the metal sheet according to the invention is intended for manufacturing household electrical appliances for example, this additional operation is not carried out.

The sheet, whether skin-passed or not, then undergoes a forming process, for example by drawing, bending or profiling, preferably by drawing, in order to form a part that can then be painted. In the case of parts for the household electrical field, this coat of paint may also be optionally baked by physical and/or chemical means known per se. For this purpose, the painted part may be passed through a hot-air or induction oven, or else pass beneath UV lamps or beneath an electron beam device.

For the production of automobile parts, the sheet is dipped into a cataphoresis bath and applied in succession are a primer coat of paint, a base coat of paint and optionally a varnish top coat.

Before applying the cataphoretic coating to the part, it is degreased beforehand and then phosphated so as to ensure that said coating adheres. The cataphoretic coating provides the part with additional corrosion protection. The primer coat of paint, generally applied by spray coating, prepares the final appearance of the part and protects it from stone chippings and from UV radiation. The base coat of paint gives the part its color and its final appearance. The varnish coat gives the surface of the part good mechanical strength, good resistance to aggressive chemicals and an attractive surface appearance.

The coat of paint (or paint system) used to protect the galvanized parts and to ensure an optimum surface appearance has for example a cataphoretic coating 10 to 20 μm in thickness, a primer coat of paint less than 30 μm in thickness and a base coat of paint less than 40 μm in thickness.

In cases in which the paint system further includes a varnish coat, the thicknesses of the various coats of paint are generally the following:
  cataphoretic coating: less than 10 to 20 μm;
  primer coat of paint: less than 20 μm;
  base coat of paint: less than 20 μm and advantageously less than 10 μm; and
  varnish coat: preferably less than less than 30 μm.

The paint system may also comprise no cataphoretic coating, and may comprise only a primer coat of paint and a base coat of paint and optionally a varnish coat.

Trials

Trials were carried out on a cold-rolled metal strip made of IF-Ti steel, which was passed through a tank containing a metal bath based on zinc comprising variable proportions of aluminum and magnesium. The bath was maintained at a temperature 70° C. above the liquidus of the composition.

Upon leaving the bath, the coating obtained was wiped with nitrogen, by means of two conventional nozzles, so as to obtain a coating thickness of around 7 μm.

The path of the steel strip between the outlet of the coating bath and the post-wiping zone was subdivided into four zones:
- a zone 1 going from the outlet of the bath up to a distance of 10 cm beneath the wiping line;
- a zone 2 going from the end of zone 1 up to the wiping line;
- a zone 3 going from the end of zone 2 up to a distance of 10 cm above the wiping line; and
- a zone 4 going from the end of zone 3 up to the point of solidification of the metal coating.

Placed in each of these zones were confinement boxes with various nitrogen-based atmospheres containing a volume fraction of oxygen as indicated in the following table, or else consisting of air. Specific sensors were used to check the oxygen content in the boxes.

Three series of specimens were taken from the sheet once it had been coated. The first series underwent no further modification, the second series was drawn in 3.5% equibiaxial strain (Marciniak) mode while the third series was firstly subjected to a skin-pass operation with a 1.5% elongation and then drawn, as in the second series.

As the trials progressed, the waviness $Wa_{0.8}$ was measured. This measurement consisted in using a mechanical probe, without a slide, to determine a profile of the sheet over a length of 50 mm, measured at 45° to the rolling direction. The approximation of its general shape by a 5th-order polynomial was determined from the signal obtained. The waviness Wa was then isolated from the roughness Ra by a Gaussian filter with a 0.8 mm cutoff threshold. The results obtained are given in the following table:

Trials 5, 7, 9 and 10 show that if the wiping of the coating is not controlled, waviness values according to the prior art are obtained, these being far above those that can be achieved according to the invention.

Trial 4 did not allow the waviness of the coating obtained to be evaluated because of point defects judged to be of unacceptable appearance for a body part product (dross entrainment, jet lines).

Finally, it may be seen that trials 2, 3, 6, 8 and 11-13 according to the invention do indeed make it possible to obtain waviness levels not hitherto obtainable.

The invention claimed is:

1. A process for manufacturing a metal strip having a metal coating for corrosion protection, comprising the steps of:
   passing the metal strip through a bath of molten metal, comprising 0.2 to 8% by weight of aluminum and magnesium in the following proportions:
     0.1 to 8% by weight of magnesium for an aluminum content equal to or greater than 0.2% but less than 4% by weight or
     a content greater than 5% but less than or equal to 8% by weight of magnesium for an aluminum content equal to or greater than 4% but less than or equal to 8% by weight,
   and comprising up to 0.3% by weight of additional elements, the balance being zinc and inevitable impurities; then
   wiping the coated metal strip by means of nozzles that spray a gas on each side of the strip, said gas having an oxidizing power lower than that of an atmosphere consisting of 4% oxygen by volume and 96% nitrogen by volume; and then
   making the strip pass through a confinement zone bounded:
     at the bottom, by the wiping line and the upper external faces of said wiping nozzles,
     at the top, by the upper part of two confinement boxes placed on each side of the strip, just above said

|  | Composition of the coating (wt %) | | | Zone 1 | Zone 2 | Zone 3 | Zone 4 | Waviness $Wa_{0.8}$ (μm) | | | |
|---|---|---|---|---|---|---|---|---|---|---|---|
|  |  |  |  |  |  |  |  | No skin-pass or deformation | No skin-pass and after deformation | With skin-pass and before deformation | With skin-pass and after deformation |
| Trial | Zn | Al | Mg | (vol %) | (vol %) | (vol %) | (vol %) |  |  |  |  |
| 1 | 98.7 | 0.3 | 1 | Air | Air | 6% $O_2$ | Air | 0.74 | 0.69 | 0.48 | 0.71 |
| 2* | 98.7 | 0.3 | 1 | Air | Air | 3% $O_2$ | Air | 0.64 | 0.57 | 0.45 | 0.63 |
| 3 | 98.7 | 0.3 | 1 | Air | Air | 1% $O_2$ | Air | 0.65 | 0.54 | 0.42 | 0.61 |
| 4* | 98.7 | 0.3 | 1 | 0.1% $O_2$ | 0.1% $O_2$ | 0.1% $O_2$ | Air | ne | ne | ne | ne |
| 5 | 97 | 1.5 | 1.5 | Air | Air | Air | Air | 1.01 | 0.92 | 0.47 | 0.96 |
| 6* | 97 | 1.5 | 1.5 | Air | Air | 3% $O_2$ | Air | 0.62 | 0.55 | 0.41 | 0.47 |
| 7 | 95.5 | 3 | 1.5 | Air | Air | Air | Air | 1.07 | 1 | 0.49 | 1.02 |
| 8 | 95.5 | 3 | 1.5 | Air | Air | 3% $O_2$ | Air | 0.65 | 0.59 | 0.44 | 0.61 |
| 9* | 93.1 | 3.9 | 3 | Air | Air | Air | Air | 1.21 | 1.08 | 0.42 | 0.97 |
| 10 | 93.1 | 3.9 | 3 | Air | 3% $O_2$ | Air | Air | 1.17 | 1.06 | 0.44 | 0.93 |
| 11 | 93.1 | 3.9 | 3 | Air | 3% $O_2$ | 3% $O_2$ | Air | 0.61 | 0.55 | 0.43 | 0.6 |
| 12* | 93.1 | 3.9 | 3 | 3% $O_2$ | 3% $O_2$ | 3% $O_2$ | Air | 0.63 | 0.52 | 0.47 | 0.59 |
| 13 | 93.1 | 3.9 | 3 | Air | Air | 3% $O_2$ | Air | 0.59 | 0.53 | 0.48 | 0.56 | ne: not evaluated;
*according to the invention.

Considering trial 1, it may be seen that too high an oxidizing power means that it is not possible to obtain a product with a waviness compatible with the production of body parts.

nozzles, and having a height of at least 10 cm in relation to the wiping line and
on the sides, by the lateral parts of said confinement boxes, the atmosphere in said confinement zone having an oxidizing power lower than that of an atmosphere consisting of 4% oxygen by volume and 96% nitrogen by volume and higher than that of an atmosphere consisting of 0.15% oxygen by volume and 99.85% nitrogen by volume.

2. The process as claimed in claim 1, for which said confinement boxes have a height of at least 15 cm in relation to the wiping line.

3. The process as claimed in claim 1, for which said confinement boxes are fed with a gas having an oxidizing power lower than that of an atmosphere consisting of 4% oxygen by volume and 96% nitrogen by volume.

4. The process as claimed in claim 1, for which the strip passes through a further confinement zone located before the wiping line.

5. The process as claimed in claim 4, for which said further confinement zone located before the wiping starts at an outlet of the molten metal bath and finishes beneath the wiping line.

6. The process as claimed in claim 1, for which the wiping gas consists of nitrogen.

7. The process as claimed in claim 1, for which the metal strip is a steel strip.

8. The process as claimed in claim 1, further comprising preparing the surface of the strip via an annealing operation prior to the step of passing the metal strip through a bath of molten metal.

9. The process as claimed in claim 1, wherein the bath is maintained at a temperature between 350 and 700° C.

10. The process as claimed in claim 1, wherein the wiping gas is argon.

11. The process as claimed in claim 1, further comprising performing a skin-pass operation on the metal strip.

12. The process as claimed in claim 1, further comprising forming the metal strip into a part.

13. The process as claimed in claim 1, wherein the bath includes 0.1 to 8% by weight of magnesium for an aluminum content equal to or greater than 0.2% but less than 4% by weight.

14. The process as claimed in claim 1, wherein the bath includes a content greater than 5% but less than or equal to 8% by weight of magnesium for an aluminum content equal to or greater than 4% but less than or equal to 8% by weight.

15. The process as claimed in claim 1, wherein the additional elements include Si, Sb, Pb, Ti, Ca, Mn, Sn, La, Ce, Cr, Ni, Zr, or Bi.

16. The process as claimed in claim 15, wherein there is 0.01% or less titanium in the bath.

17. The process as claimed in claim 1, wherein the confinement boxes have a height of at least 30 cm in relation to the wiping line.

18. The process as claimed in claim 1, wherein the coating has a thickness of 7 µm.

* * * * *